United States Patent
Bianchi et al.

(10) Patent No.: US 9,639,730 B2
(45) Date of Patent: May 2, 2017

(54) AIMING SYSTEM AND METHOD FOR MACHINE-READABLE SYMBOL READERS

(71) Applicant: Datalogic IP Tech Srl, Bologna (IT)

(72) Inventors: Maurizio Bianchi, Bologna (IT); Davide Bruni, Bologna (IT)

(73) Assignee: DATALOGIC IP TECH SRL, Bologna (IT)

( * ) Notice: Subject to any disclaimer, the term of this patent is extended or adjusted under 35 U.S.C. 154(b) by 0 days.

(21) Appl. No.: 14/511,121

(22) Filed: Oct. 9, 2014

(65) Prior Publication Data
US 2016/0104018 A1    Apr. 14, 2016

(51) Int. Cl.
  *G06K 7/10*    (2006.01)
  *G06K 7/015*    (2006.01)

(52) U.S. Cl.
  CPC ......... *G06K 7/10831* (2013.01); *G06K 7/015* (2013.01); *G06K 7/10732* (2013.01)

(58) Field of Classification Search
  CPC .. G06K 7/14; G06K 7/10821; G06K 7/10831; G06K 7/10881; G06K 2207/1011; G06K 7/015; G06K 7/10732
  USPC ........................ 235/462.01–462.49, 454, 435
  See application file for complete search history.

(56) References Cited

U.S. PATENT DOCUMENTS

| 5,296,689 A | 3/1994 | Reddersen et al. |
| 5,475,206 A | 12/1995 | Reddersen et al. |
| 5,550,364 A * | 8/1996 | Rudeen .................... 235/462.34 |
| 5,734,153 A | 3/1998 | Swartz et al. |
| 5,811,828 A * | 9/1998 | Laser ............................ 250/566 |
| 6,290,134 B1 * | 9/2001 | Rando ................ G06K 7/10891 235/462.45 |
| 7,878,403 B2 | 2/2011 | Hennick et al. |
| 7,950,583 B2 | 5/2011 | Kotlarsky et al. |

(Continued)

FOREIGN PATENT DOCUMENTS

| CA | 2525058 A1 * | 7/2006 |
| EP | 0 690 401 B1 | 11/2002 |

(Continued)

OTHER PUBLICATIONS

International Search Report and Written Opinion of the International Searching Authority, mailed Feb. 3, 2016, for corresponding PCT Application No. PCT/US2015/054994, 10 pages.

*Primary Examiner* — Laura Gudorf
(74) *Attorney, Agent, or Firm* — Seed IP Law Group LLP

(57) ABSTRACT

An engine for a machine-readable symbol reader includes an image sensor; at least one optical component positioned in an optical path of the image sensor, the image sensor and the at least one optical component having a receiving optical axis and a depth of field; an illumination source; and at least two optical components positioned relative to the illumination source to direct light emitted by the illumination source outward of the engine as a first beam and at least a second beam. The first and the second beams are each parallel to the receiving optical axis of the image sensor and the at least one optical component at least along the depth of field of the image sensor and the at least one optical component. The first and the second beams are opposed to one another across the receiving optical axis of the image sensor and the at least one optical component to provide a visible aiming indication when impinging on an object.

23 Claims, 5 Drawing Sheets

(56) References Cited

U.S. PATENT DOCUMENTS

| | | |
|---|---|---|
| 8,328,099 B2 | 12/2012 | Thuries et al. |
| 2003/0226895 A1* | 12/2003 | Havens .............. G06K 7/10584 |
| | | 235/462.22 |
| 2004/0188527 A1* | 9/2004 | Tien ......................... 235/462.42 |
| 2005/0269413 A1* | 12/2005 | Hammer et al. ......... 235/462.39 |
| 2007/0084926 A1 | 4/2007 | Lopez et al. |
| 2007/0131770 A1 | 6/2007 | Nunnink |
| 2007/0170259 A1* | 7/2007 | Nunnink et al. ......... 235/462.21 |
| 2008/0035733 A1* | 2/2008 | Vinogradov et al. .... 235/462.42 |
| 2014/0123531 A1* | 5/2014 | Hancosky ................. F41G 1/54 |
| | | 42/113 |

FOREIGN PATENT DOCUMENTS

| | | |
|---|---|---|
| EP | 1 065 483 B1 | 3/2006 |
| EP | 1 345 157 B1 | 12/2006 |

* cited by examiner

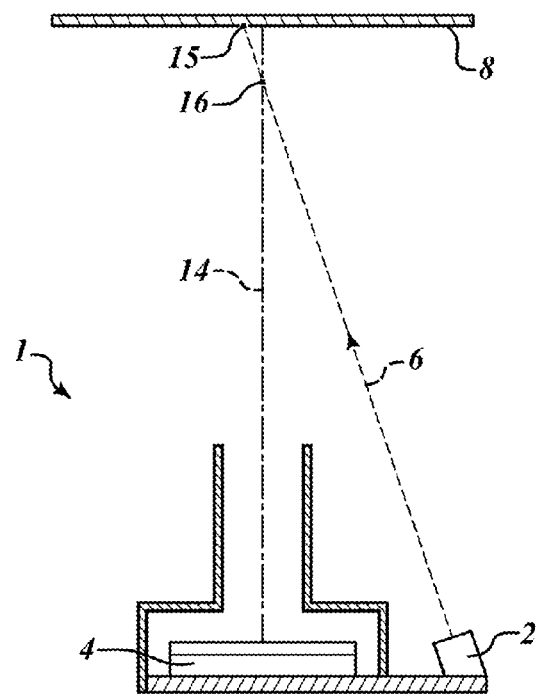
FIG. 1A *(Prior Art)*
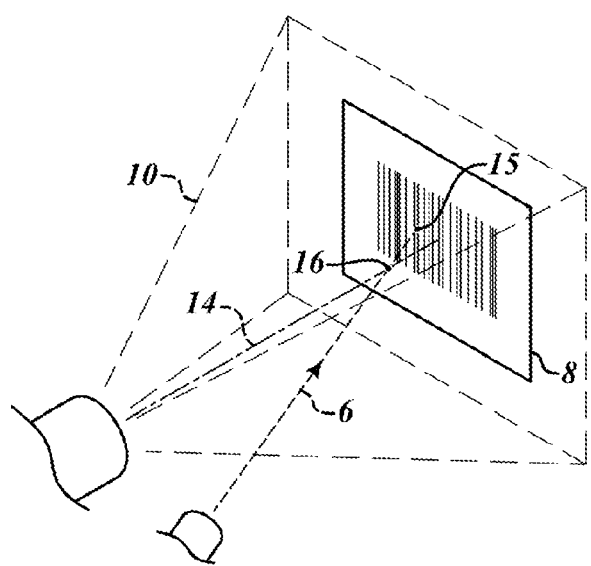
FIG. 1B *(Prior Art)*

AIMING SYSTEM AND METHOD FOR MACHINE-READABLE SYMBOL READERS

BACKGROUND

Technical Field

The present disclosure relates to machine-readable symbol readers and, more particularly, aiming systems and methods for machine-readable symbol readers.

Description of the Related Art

Machine-readable symbols encode information in a form that can be optically read via a machine-readable symbol reader or scanner. Machine-readable symbols take a variety of forms, the most commonly recognized form being the linear or one-dimension barcode symbol. Other forms include two-dimensional machine-readable symbols such as stacked code symbols, and area or matrix code symbols. These machine-readable symbols are typically composed on patterns of high and low reflectance areas. For instance, a barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, and/or may include more than two colors (e.g., more than black and white).

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), European Article Number (EAN), Code 39, Code 128, Data Matrix, PDF417, etc.

Machine-readable symbols have widespread and varied applications. For example, machine-readable symbols can be used to identify a class of objects (e.g., merchandise) or unique items (e.g., patents). As a result, machine-readable symbols are found on a wide variety of objects, such as retail goods, company assets, and documents, and help track production at manufacturing facilities and inventory at stores (e.g., by scanning items as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a data reader to allow the customer to redeem a coupon or to verify that the customer has purchased a ticket for the event.

Machine-readable symbol readers or data readers are used to capture images or representations of machine-readable symbols appearing on various surfaces to read the information encoded in the machine-readable symbol. One type of commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Another type of machine-readable symbol reader is a scanning or laser-based (i.e., flying spot) machine-readable symbol reader, which scans a relative narrow beam or spot of light sequentially across the machine-readable symbol.

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Reading a symbol typically employs generating an electrical signal having an amplitude determined by the intensity of the collected light. Relatively less reflective or darker regions (e.g., bars or other marks) may, for example, be characterized or represented in the electrical signal by an amplitude below a threshold amplitude, while relatively more reflective or lighter regions (e.g., white spaces) may be characterized or represented in the electrical signal an amplitude above the threshold amplitude. When the machine-readable symbol is imaged, positive-going and negative-going transitions in the electrical signal occur, signifying transitions between darker regions and lighter regions. Techniques may be used for detecting edges of darker regions and lighter regions by detecting the transitions of the electrical signal. Techniques may also be used to determine the dimensions (e.g., width) of darker regions and lighter regions based on the relative location of the detected edges and decoding the information represented by the machine-readable symbol.

In machine-readable symbol readers, a return light signal from the object or symbol being read is focused onto a sensor or sensor array. In the example of a machine-readable symbol reader reading marks and spaces of a typical machine-readable symbol, there needs to be sufficient difference in signal intensity between the signal corresponding to the light space and the signal corresponding to the dark bar in order for the processor to differentiate therebetween. Depth of field plays an important role in effectively detecting an image at the sensor. Thus, in machine-readable symbol reading applications there has been a demand for accurately reading the machine-readable symbols over the entire depth of field, i.e., the range of distance over which the machine-readable symbol reader can effectively scan.

Machine-readable symbol readers may be fixed, for example at a point of sale, or may be handheld or even mobile. Whether fixed, handheld, or mobile, the machine-readable symbol to be read must be within a field of view of the machine-readable symbol reader. Thus, some machine-readable symbol readers include an aiming system which provides or projects an aiming pattern. This allows a user to position the machine-readable symbol reader (e.g., handheld) relative to a target or machine-readable symbol, or conversely position the target or machine-readable symbol relative to the machine-readable symbol reader (e.g., fixed).

Conventional machine-readable symbol readers, however, have proven to be problematic. For instance, FIGS. 1A and 1B illustrate a typical machine-readable symbol reader 1. The machine-readable symbol reader 1 includes an illumination source 2 and an image sensor or sensor array 4. The illumination source 2 emits light to generate an aiming beam 6 which impinges on an item or object 8 positioned within a field of view 10 to generate an aiming pattern. An image of the item or object 8 is captured by the image sensor or sensor array 4. The returned image can be directed onto the image sensor or array 4 along an optical axis 14, which extends from the image sensor or array 4.

As illustrated in FIGS. 1A and 1B, the illumination source 2 is angularly spaced with respect to the optical axis 14. Consequently, a spot 15 projected on the item or object 8 by the angular orientation of the illumination source 2 aligns with the optical axis 14 at a singular point 16 across the depth of field. Having a singular alignment point can compromise the accuracy of the reading capability of the image sensor or array 4 to read the image of the item or object 8 to be returned to the image sensor or array 4. For instance, a user may laterally move the machine-readable symbol reader 1 to align the spot 15 with a center of the item or object 8. As a result, the optical axis 14 may no longer be aligned with the center of the item or object 8. In other instances, the user may have to move the machine-readable symbol reader 1 in the forward-aft direction within the field of view 10 to align the spot 15 with the center of the item or object 8.

Solutions addressing the deficiencies in the alignment capabilities of conventional machine-readable symbol readers have involved using at least two illumination sources generating parallel aiming beams to project aiming patterns that encompass the center of the item or object. However, such solutions increase manufacturing and labor costs and complexity of the machine-readable symbol readers.

BRIEF SUMMARY

In various implementations, machine-readable symbol readers described herein provide aiming indications to users which improve accuracy and performance of the machine-readable symbol readers to acquire and process images of machine-readable symbols. According to one embodiment, an engine for a machine-readable symbol reader may be summarized as including an image sensor; at least one optical component positioned in an optical path of the image sensor, the image sensor and the at least one optical component having a receiving optical axis and a depth of field; an illumination source; and at least two optical components positioned relative to the illumination source to direct light emitted by the illumination source outward of the engine as a first beam and at least a second beam. The first and second beams are each parallel to the receiving optical axis of the image sensor and the at least one optical component at least along the depth of field of the image sensor and the at least one optical component. The first and the second beams are opposed to one another across the receiving optical axis of the image sensor and the at least one optical component to provide a visible aiming indication when impinging on an object.

The at least two optical components positioned relative to the illumination source to direct light emitted by the illumination source outward of the engine may include a splitter and a reflector. The splitter may be positioned to receive light emitted by the illumination source and reflect a first portion of the received light as the first beam and pass a second portion of the light to the reflector. The reflector may be positioned to receive the second portion of the light and reflect the second portion of the light as the second beam.

The illumination source may be positioned to emit light in a direction that is perpendicular to the receiving optical axis or the illumination source may be positioned to emit light in a direction that is parallel to the receiving optical axis.

The illumination source may be positioned to emit light in a direction that passes between the image sensor and the at least one optical component, or the illumination source may be positioned to emit light in a direction that does not pass between the image sensor and the at least one optical component.

The engine may further comprise a first beam shaper positioned in a path of the first beam; and a second beam shaper positioned in a path of the second beam. The first and second beam shapers may form the first and at least the second beams as an aiming pattern.

A machine-readable symbol reader to read machine-readable symbols may be summarized as including a housing having an optical chamber; an image sensor having at least one portion exposed to an interior of the optical chamber; an aiming beam illumination source to emit light; a first optical component; and a second optical component. The first optical component may reflect a portion of the light emitted by the illumination source as a first beam and which may pass a second portion of the light emitted by the illumination source. The second optical component may reflect at least some of the second portion of the light as a second beam. The first and at least the second beams may exit the housing and remain parallel with an optical image sensing axis of the machine-readable symbol reader over at least a depth of field of the image sensor.

The first beam may be diametrically opposed from the second beam across the optical image sensing axis of the machine-readable symbol reader and/or the first and second beams may be equidistantly spaced apart from one another across the optical image sensing axis of the machine-readable symbol reader.

The first optical component may be a splitter and the second optical component may be a mirror. The splitter and mirror may be oriented at an angle to the optical image sensing axis of the machine-readable symbol reader.

The machine-readable symbol reader may further comprise at least one beam shaper positioned to receive the first and the second beams, and control intensities of the first and the second beams to form an aiming pattern. The machine-readable symbol reader may also further comprise a lens assembly disposed in an optical path of the image sensor; a collimator; and a focusing lens. The focusing lens and the collimator may be positioned to direct the light emitted by the illumination source toward the first optical component.

The illumination source, the first optical component, and the second optical component of the machine-readable symbol reader may each be located relatively in front of the image sensor; or the illumination source, the first optical component, and the second optical component may each be located relatively behind the image sensor, with a front of the image sensor comprising the portion of the image sensor responsive to light.

The housing of the machine-readable symbol reader may comprise a first aperture through which the first beam is directed, a second aperture through which the second beam is directed, and a third aperture aligned with the optical image sensing axis of the machine-readable symbol reader.

The first and the second apertures may be sized and shaped to prevent interference of the first and the second beams with the image sensor.

BRIEF DESCRIPTION OF THE SEVERAL VIEWS OF THE DRAWINGS

FIG. 1A is a schematic diagram showing a conventional machine-readable symbol reader with an aiming system, positioned relative to a machine-readable symbol.

FIG. 1B is an isometric view of the machine-readable symbol reader of FIG. 1A, illustrating a field of view thereof and an aiming pattern projected by the aiming system.

DETAILED DESCRIPTION

Figure 2A:
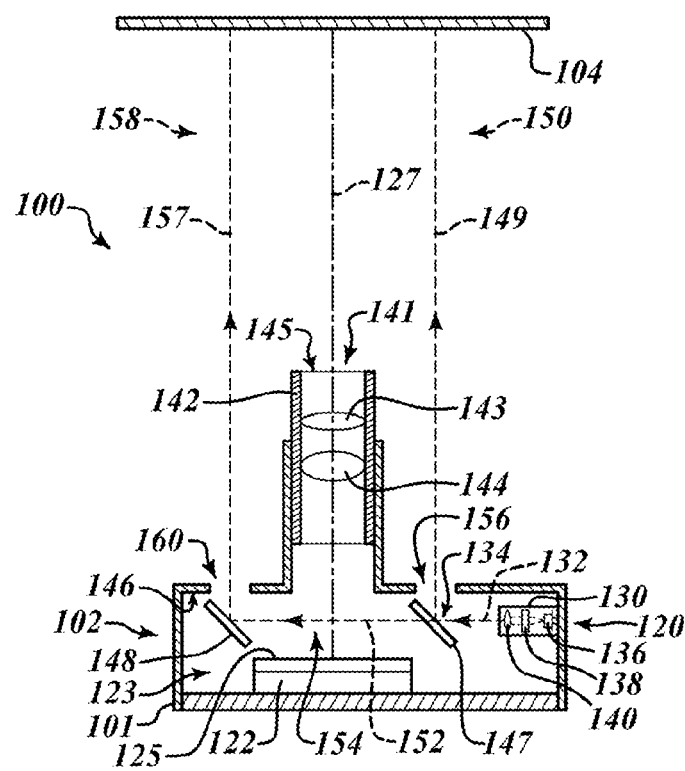
FIG. 2A is a schematic diagram showing a machine-readable symbol reader with an aiming system, positioned relative to a machine-readable symbol, according to one embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the various embodiments of machine-readable symbol readers and aiming systems have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Disclosed herein are embodiments of machine-readable symbol readers with improved accuracy and performance. The embodiments of machine-readable symbol readers provide aiming patterns that are aligned with an optical axis of an image sensor through the depth of field. The alignment of the aiming patterns can be provided using a single illumination source. The single illumination source can be directed toward an object or image to be read and which can generate at least two parallel aiming beams. The at least two parallel aiming beams are directed along an optical path that is parallel to the optical axis of the image sensor. Thus, the returned image can be focused to the image sensor, such that the returned image is read with improved accuracy.

In some embodiments, the at least two parallel aiming beams are positioned to be proximal to the optical axis of the image sensor. The distance between the two parallel aiming beams can be reduced such that the two parallel aiming beams are located proximal to a central point, which is an imaginary, geometric projection of the optical axis of the image sensor on the object or image to be read.

In other embodiments, the at least two parallel beams are not only centrally aligned with the optical axis of the image sensor, but also project various complex shapes and figures on a surface having a machine-readable symbol to be read by the image sensor.

Figure 2B:
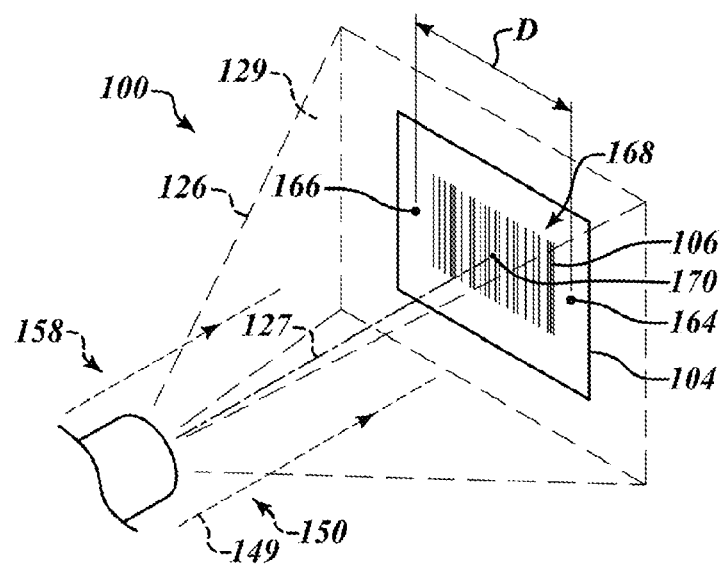
FIG. 2B is an isometric view of the machine-readable symbol reader of FIG. 2A, illustrating a field of view thereof and an aiming pattern projected by the aiming system.

FIGS. 2A and 2B show a machine-readable symbol reader 100 to read machine-readable symbols, according to one embodiment. The machine-readable symbol reader 100 includes a housing 101 and an information acquisition component or engine 102 to read information from an item or object 104 having an image of a machine-readable symbol 106. The engine 102 includes an illumination source 120 and an image sensor or sensor array 122. The housing 101 carries the engine 102 and at least some of its components, including the illumination source 120 and the image sensor or sensor array 122. While not illustrated, the engine 102 may include a source of light (e.g., LEDs) to illuminate the machine-readable symbol 106 when in a field of view of the machine-readable symbol reader 100. The source of light may produce light that is not particularly visible to a human, for example white light which may not be visually distinct from white light in the ambient environment. In contrast, the illumination source 120 produces light that is visible or visually distinct to humans when the light impinges on an object, for instance red laser light. Moreover, while FIGS. 2A and 2B show a portion of the engine 102, the engine 102 can include additional components, such as driving electronics, a decode processor, etc.

The housing 101 includes an interior volume which defines an optical chamber 123 within which the illumination source 120 and the image sensor or sensor array 122 are housed. In particular, the image sensor or sensor array 122 includes a front portion 125. The front portion 125 of the image sensor or sensor array 122 is located within or proximal to the optical chamber 123, such that the front portion 125 is exposed to at least some of the light emanating within a field of view 126. In particular, the field of view 126 has a depth of field 129. The depth of field 129 is a length along the optical axis 127 of the image sensor or sensor array 122 within which a target item or object 104 may be shifted before the image of the machine-readable symbol 106 may no longer be accurately read.

The illumination source 120 is mounted within an interior housing member 130. The interior housing member 130 is located in the optics chamber 123 and secured to the housing 101 of the machine-readable symbol reader 100. The interior housing member 130 can be secured to the housing 101 using various means, such as fasteners, adhesives, etc. While the embodiment of the machine-readable symbol reader 100 of FIGS. 2A and 2B shows the illumination source 120 secured to the housing 101 within the optics chamber 123, in other embodiments, the illumination source 120 may be located in a region aft or behind the image sensor or sensor array 122. For example, in some embodiments, the illumination source 120 may be mounted externally to the housing 101 and secured thereto. The illumination source 120 emits light to generate an aiming beam 132 that travels through the interior housing member 130 and into an opening 134 located in the housing 101. In one non-limiting example embodiment of the machine-readable symbol reader 100 illustrated in FIGS. 2A and 2B, the illumination source 120 comprises a light source 136 that generates a laser beam. However, in other embodiments, various other sources of light may generate the aiming beam 132.

In some embodiments, including the example embodiment of the machine-readable symbol reader 100 illustrated in FIGS. 2A and 2B, the interior housing member 130 includes a collimator 138, a focusing lens 140, and optionally a light beam shaping aperture. The collimator 138 and the focusing lens 140 collectively direct the aiming beam 132 towards one end of the housing 101. This end of the housing 101 is an opposing end with respect to an end proximal to where the illumination source 120 is located.

The engine 102 also includes a lens assembly 141 secured in a lens housing 142. The lens housing 142 is mounted in the housing 101 of the machine-readable symbol reader 100 and secured thereto. The lens housing 142 can be secured to the housing 101 of the machine-readable symbol reader 100 using various means, such as fasteners, adhesives, etc. The lens housing 142 is located forward of the image sensor or sensor array 122, such that the lens housing 142 is positioned in an optical path of the image sensor or sensor array 122. The lens assembly 141 includes a first lens 143 and a second lens 144. The first lens 143 is positioned forward of the second lens 144. Both the first and second lenses 143, 144 are positioned within the lens housing 142 such that an optical center of the respective lenses 143, 144 coincides with the optical axis 127 of the image sensor or sensor array 122. In this manner, the optical axis 127 of the image sensor or sensor array 122 extends through the optical centers of the lenses 143, 144 to focus the light returned (e.g., reflected, scattered, fluoresced) from the machine-readable symbol 106 to the image sensor or sensor array 122.

The lens assembly 141 further includes an aperture 145. The aperture 145 is located at a front end of the lens housing 142, such that the front end is positioned proximal to the item or object 104. Again, the optical axis 127 of the image sensor or sensor array 122 extends through a center of the aperture 145 to focus the light returned from the machine-readable symbol 106 to the image sensor or sensor array 122.

In some embodiments, including the lens assembly 141 illustrated in FIGS. 2A, 2B, the first and second lenses 143, 144 may have varying thicknesses to adjust the foci length of the respective lenses 143, 144, such that light returned from the machine-readable symbol 106 is focused to the image sensor or sensor array 122. In other embodiments, however, the lens assembly 141 may include lenses with relatively similar thicknesses and may include a multitude of lenses (e.g., three lenses, four lenses, etc.).

As noted above, the aiming beam 132 travels through the opening 134 located in the housing 101. More particularly, the image sensor or sensor array 122 is spaced apart from an interior surface 146 of the lens housing 142 to define the opening 134. The opening 134 is sized and shaped to permit the aiming beam 132 and any subsequent beams generated therefrom to travel through the housing 101 in a lateral direction without causing any adverse interference with the image sensor or sensor array 122.

The engine 102 includes a splitter 147 and a reflector 148. The splitter 147 may include one or more refractive or diffractive beam splitters, dichroic mirrors, half-mirrors, or the like. The reflector 148 may include one or more mirrors, prisms, or the like. The splitter 147 and the reflector 148 are secured to the housing 101. The splitter 147 and the reflector 148 can be secured to the housing 101 of the machine-readable symbol reader 100 using various means, such as fasteners, adhesives, etc.

The splitter 147 is operable to split the aiming beam 132 incident on it into a first beam 149 having a first optical path 150 and a transition beam 152 having a transition optical path 154. The first and transition optical paths 150, 154 are substantially perpendicular to one another. More particularly, the splitter 147 reflects a portion of the aiming beam 132 to travel along the first optical path 150. The first beam 149 exits the housing 101 from a first aperture 156. The splitter 147 also transmits or passes a portion of the aiming beam 132 to travel along the transition optical path 154 towards the reflector 148. As the transition beam 152 arrives at the reflector 148, the transition beam 152 is reflected to a second beam 157 having a second optical path 158. The second beam 157 exits the housing 101 from a second aperture 160.

The splitter 147 and the reflector 148 are oriented to have an angular spacing with respect to a front side of the interior housing member 130. As such, the splitter 147 and the reflector 148 are angularly spaced apart with respect to the aiming beam 132 generated by the illumination source 120 and/or the optical axis 127 of the image sensor or sensor array 122. In this manner, the aiming beam 132 can be reflected, refracted, and/or diffracted to have the first, transition, and second optical paths 150, 154, 158 due to the non-zero angular spacing of the splitter 147 and the reflector 148 with respect to the front side of the interior housing member 130 and/or the optical axis 127. For example, in the example embodiment of the machine-readable symbol reader 100 of FIGS. 2A and 2B, the splitter 147 is oriented at a substantially forty-five degree angle with respect to the front face of the interior housing member 130 and the optical axis 127 to transmit a portion and reflect a portion of the aiming beam 132. In this orientation, the splitter 147 transmits about fifty percent of the aiming beam 132 to a transition beam 152 and reflects about fifty percent of the aiming beam 132 to a first beam 149. Similarly, the reflector 148 is oriented at a forty-five degree angle with respect to the front face of the interior housing member 130 and the optical axis 127 to reflect the transition beam 152 to a second beam 157. In other embodiments, however, the splitter 147 and the reflector 148 may have other orientations to reflect, refract, and/or diffract other percentages of portions of the aiming beam 132, which are within the scope and spirit of the disclosed subject matter.

As illustrated in FIG. 2B, the first optical path 150 of the first beam 149 and the second optical path 158 of the second beam 157 are substantially parallel to each other. More particularly, the first beam 149 is projected on the item or object 104 at a first aiming spot 164 and the second beam 157 is projected on the item or object 104 at a second aiming spot 166 to define an aiming pattern 168. The first and second aiming spots 164, 166 are spaced apart relatively equidistantly with respect to the optical axis 127 or a central point 170 by a distance D. The central point 170 is an imaginary, geometric projection of the optical axis 127 of the image sensor or sensor array 122 on the item or object 104. As the first beam 149 and the second beam 157 travel in a direction that is substantially parallel to the optical axis 127, the aiming pattern 168 advantageously encompasses the central point 170 through the depth of field 129. In this manner, a user can visually locate and target a relative center of the machine-readable symbol 106 through the depth of field 129. Light (e.g., ambient illumination, flood illumination) returned from the machine-readable symbol 106 can thereafter be received along an axis that is substantially parallel to the optical axis 127 of the image sensor or sensor array 122 and also centrally positioned with respect to the image sensor or sensor array 122.

Further, the splitter 147 and the reflector 148 are advantageously located within the opening 134, proximal to the first and second apertures 156, 160, respectively, and at a location which is forward of the image sensor or sensor array 122. Having such positioning enables the distance D to be adjustable. For example, in some embodiments, the distance D can be reduced. Thus, the first beam 149 and second beam 157 can be spaced apart from the optical axis 127 by a minimal distance, such that the first and second aiming spots 164, 166 can be projected in close proximity to the optical axis 127 or the central point 170. In this manner, a user may visually locate and target the center of the machine-readable symbol 106 and receive more precise readings to be processed by the image sensor or sensor array 122 through the depth of field 129.

With continued reference to FIGS. 2A and 2B, the image sensor or sensor array 122 forms an electronic image of the field of view 126. The image sensor or sensor array 122 may comprise a wide range of image sensing devices for converting an optical image (or another wavelength in the electromagnetic spectrum) of the machine-readable symbol 106 into an electrical signal. For example, the image sensor or sensor array 122 may comprise a digital sensor, such as a charge-coupled device (CCD) sensor array or complimentary metal-oxide semiconductor (CMOS) sensor array, both of which form a one-dimensional or two-dimensional array of pixels, which together constitute an electronic representation of the image. Each pixel location stores data indicative of the light intensity at that location of the image. The light intensity data for each pixel may represent a color (e.g., red-green-blue) or monochrome intensity (e.g., grayscale). After the image sensor or sensor array 122 has been exposed to light emanating from the field of view 126, data from all the pixels can be sequentially read out in a selectable pattern (which may be row-by-row, sub-region by sub-region, or some other pattern). The pixel intensity data may optionally be converted to digital form using an analog-to-digital converter before being supplied to a controller.

The controller may include or comprise a DSP, for example, a DSP architecture such as the Blackfin® processor family from Analog Devices, Norwood, Mass., or a microcontroller, such as the high-speed ARMO processor family from ARM Ltd., Cambridge, United Kingdom. In general, the controller processes the image data so as to attempt to decode the machine-readable symbol 106 that has been focused onto the image sensor or sensor array 122. The controller may condition the data received from the image sensor or sensor array 122 and may generate an output that generally identifies which regions of the image correspond to highly reflective or light areas, and which correspond to less reflective or dark areas, for example.

More generally, a control system that operates the embodiments of the machine-readable symbol readers and methods described herein may include, without limitation, one or more computing devices, such as processors, microprocessors, digital signal processors (DSP), application-specific integrated circuits (ASIC), and the like. To store information, the control system may also include one or more storage devices, such as volatile memory, non-volatile memory, read-only memory (ROM), random access memory (RAM), and the like. The storage devices can be coupled to the computing devices by one or more buses. The control system may further include one or more input devices (e.g., displays, keyboards, touchpads, controller modules, or any other peripheral devices for user input) and output devices (e.g., displays screens, light indicators, and the like). The control system can store one or more programs for processing any number of different apparatuses and methods according to various embodiments described herein to detect the operating conditions of motors. The control system, according to one embodiment, may be provided in the form of a general purpose computer system. The computer system may include components such as a CPU, various I/O components, storage, and memory. The I/O components may include a display, a network connection, a computer-readable media drive, and other I/O devices (a keyboard, a mouse, speakers, etc.). A control system manager program may be executing in memory, such as under control of the CPU, and may include functionality related to operating the machine-readable symbol reader.

While the embodiment of the machine-readable symbol reader 100 shown in FIGS. 2A and 2B includes an illumination source 120 that is oriented in a manner such that the aiming beam 132 travels along a path that is substantially perpendicular to the optical axis 127, in other embodiments, the illumination source 120 may be oriented to generate an aiming beam 132 that travels along a path that is substantially parallel to the optical axis 127 of the image sensor or sensor array 122. For example, in some embodiments, the interior housing member 130 may be positioned adjacent to the image sensor or sensor array 122 to generate an aiming beam 132 that travels along a path that is substantially parallel to the optical axis 127.

Further, in some embodiments, the machine-readable symbol reader 100 may optionally and/or additionally include beam shapers to generate selectable aiming patterns on the item or object 104, as discussed in more detail below.

Figure 3A:
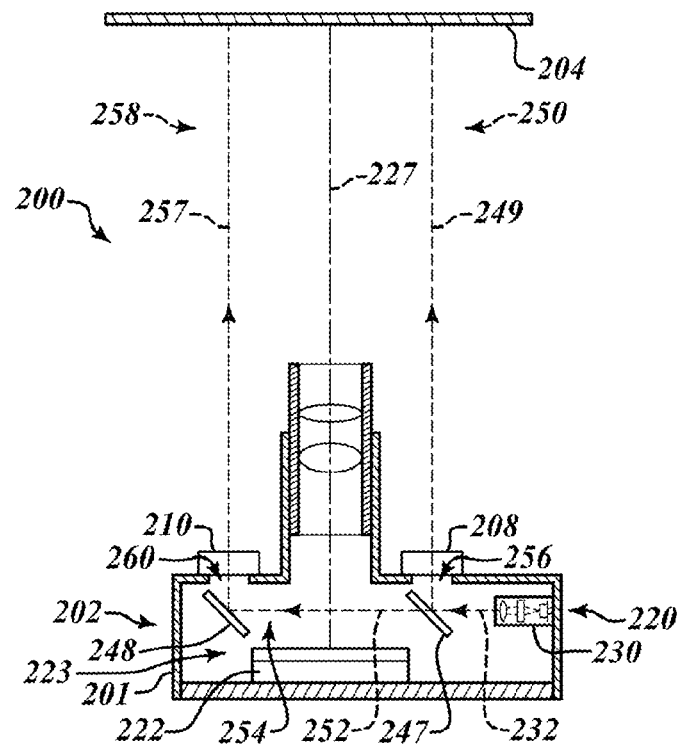
FIG. 3A is a schematic diagram showing a machine-readable symbol reader with an aiming system, positioned relative to a machine-readable symbol, according to another embodiment.
Figure 3B:
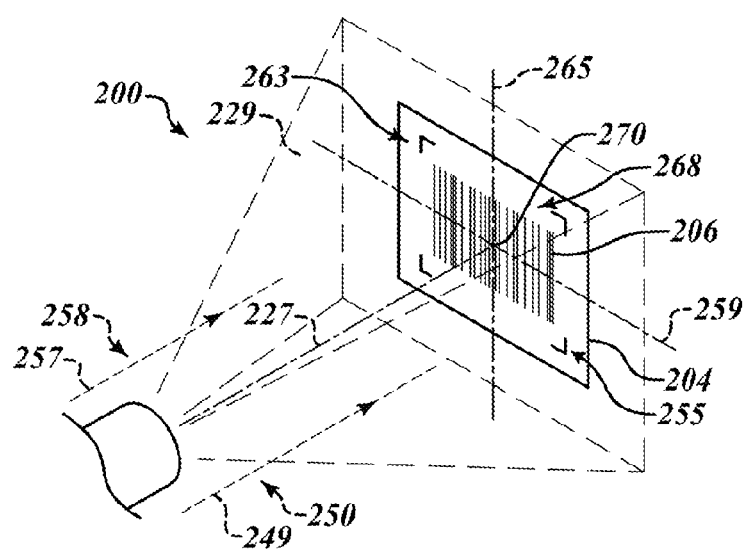
FIG. 3B is an isometric view of the machine-readable symbol reader of FIG. 3B, illustrating a field of view thereof and an aiming pattern projected by the aiming system.

FIGS. 3A and 3B show a machine-readable symbol reader 200 to read machine-readable symbols, according to another embodiment. The machine-readable symbol reader 200 includes an engine 202 to read an image of a machine-readable symbol 206 disposed on an item or object 204. In this embodiment, the engine 202 provides a variation which includes a first beam shaper 208 and a second beam shaper 210. The first and second beam shapers 208, 210 can include diffractive optics, refractive optics, reflective optics, or other optics to transform and/or control an intensity profile of an aiming beam 232 generated by an illumination source 220, such as an aiming beam having a Gaussian profile, for example. More particularly, the first and second beam shapers 208, 210 are configured to transform and/or control the intensity profile of the light beams to project an aiming pattern 268 having selectable intensity patterns. The intensity patterns may include various shapes and representations, such as rectangular, circular, logos, and/or other complex shapes.

The first and second beam shapers 208, 210 are mounted proximal to corresponding first and second apertures 256, 260 located in a housing 201 of the machine-readable symbol reader 200. The aiming beam 232 generated by the illumination source 220 is directed to a splitter 247. The splitter 247 splits the aiming beam 232 to a first beam 249 having a first optical path 250 and a transition beam 252 having a transition optical path 254. A portion of the aiming beam 232 is reflected to travel along the first optical path 250 exiting from the first aperture 256. The first beam 249 is received by the first beam shaper 208. The first beam shaper 208 transforms the first beam 249 to project a first aiming shape 255 on the item or object 204. The first aiming shape 255 includes a pair of L-shaped images that are a mirror image of one another about a horizontal axis 259 of the item or object 204.

A portion of the first beam 249 is transmitted or passed through the splitter 247 to travel along the transition optical path 254 towards a reflector 248, such as a mirror, for example. As the transition beam 252 arrives at the reflector 248, at least a portion of the transition beam 252 is reflected to a second beam 257 having a second optical path 258. The second beam 257 exits from the second aperture 260. The second beam 257 is received by the second beam shaper 210. The second beam shaper 210 transforms the second beam 257 to project a second aiming shape 263 on the item or object 204. The second aiming shape 263 includes a pair of L-shaped images that are a mirror image of one another about the horizontal axis 259 of the item or object 204.

The first aiming shape 255 and the second aiming shape 263 are mirror images of one another about a vertical axis 265 of the item or object 204 and collectively define the aiming pattern 268 projected on the machine-readable symbol 206. More particularly, the horizontal and vertical axes 259, 265 of the item or object 204 intersect one another at a central point 270. As noted above, the central point 270 is an imaginary, geometric projection of an optical axis 227 of the image sensor or sensor array 222 on the machine-readable symbol 206. As discussed in more detail above, the first and second beams 249, 257 are substantially parallel to one another and to the optical axis 227 of the image sensor or sensor array 222. Consequently, the first and second aiming shapes 255, 263 and the resulting aiming pattern 268 encompass the central point 270 through an entire depth of field 229.

While the embodiment of the machine-readable symbol reader 200 of FIGS. 3A and 3B shows the illumination source 220 secured to the housing 201 of the machine-readable symbol reader 200 within an optics chamber 223, in other embodiments, the illumination source 220 may be located in a region aft or behind the image sensor or sensor array 222. For example, in some embodiments, the illumination source 220 may be mounted externally to the housing 201 and secured thereto.

Further, in some embodiments, the illumination source 220 may be oriented to generate an aiming beam 232 that travels along a path that is substantially parallel to the optical axis 227 of the image sensor or sensor array 222. For example, in some embodiments, an interior housing member 230 that houses the illumination source 220 may be positioned adjacent to the image sensor or sensor array 222 to generate an aiming beam 232 that travels along a path that is substantially parallel to the optical axis 227.

Figure 4:
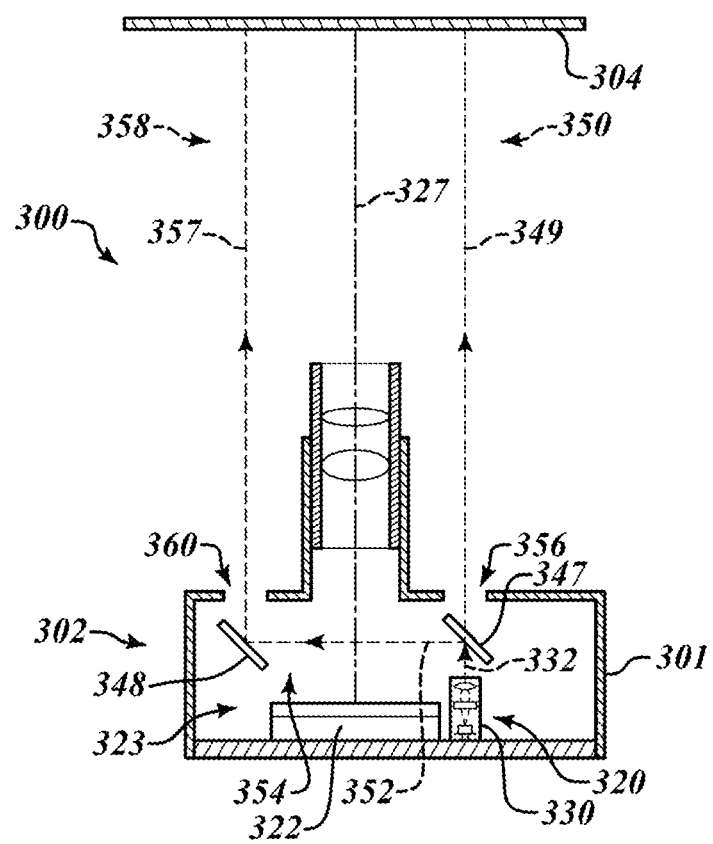
FIG. 4 is a schematic diagram showing a machine-readable symbol reader with an aiming system, positioned relative to a machine-readable symbol, according to another embodiment.

FIG. 4 shows a machine-readable symbol reader 300 to read machine-readable symbols, according to another embodiment. The machine-readable symbol reader 300 includes an engine 302 to read an image of a machine-readable symbol (not shown) disposed on an item or object 304. In this embodiment, the engine 302 provides a variation in which an illumination source 320 is positioned adjacent to an image sensor or sensor array 322. The illumination source 320 is oriented in a manner such that an aiming beam 332 travels along a path that is substantially parallel to an optical axis 327 of the image sensor or sensor array 322.

The aiming beam 332 generated by the illumination source 320 is directed to a splitter 347. The splitter 347 splits the aiming beam 332 to a first beam 349 having a first optical path 350 and a transition beam 352 having a transition optical path 354. A portion of the aiming beam 332 is transmitted or passes through a splitter 347 to travel along the first optical path 350. The first beam 349 exits from a first aperture 356. The splitter 347 also reflects a portion of the aiming beam 332 to travel along the transition optical path 354 towards a reflector 348, such as a mirror, for example. As the transition beam 352 arrives at the reflector 348, the transition beam 352 is reflected to a second beam 357 having a second optical path 358. The second beam 357 exits from a second aperture 360. Again, the first beam 349 is projected on a machine-readable symbol 306 at a first aiming spot and the second beam 357 is projected on the machine-readable symbol 306 at a second aiming spot to define an aiming pattern. As the first beam 349 and the second beam 357 travel in a direction that is substantially parallel to the optical axis 327 of the image sensor or sensor array 322, the aiming pattern advantageously encompasses a central point through the depth of field. Again, the central point is an imaginary, geometric projection of the optical axis 327 on the machine-readable symbol 306.

While the embodiment of the machine-readable symbol reader 300 of FIG. 4 shows the illumination source 320 secured to a housing 301 of the machine-readable symbol reader 300 within an optics chamber 323, in other embodiments, the illumination source 320 may be located in a region aft or behind the image sensor or sensor array 322. For example, in some embodiments, the illumination source 320 may be mounted externally to the housing 301 and secured thereto.

Further, in some embodiments, the illumination source 320 may be oriented to generate an aiming beam 332 that travels along a path that is substantially perpendicular to the optical axis 327 of the image sensor or sensor array 322. For example, in some embodiments, an interior housing member 330 that houses the illumination source 320 may be secured to a sidewall of the housing 301 to generate an aiming beam 332 that travels along a path that is substantially perpendicular to the optical axis 327.

Still further, in some embodiments, the machine-readable symbol reader 300 may optionally and/or additionally include beam shapers to generate selectable aiming patterns on the item or object 304, as discussed in more detail above.

Figure 5A:
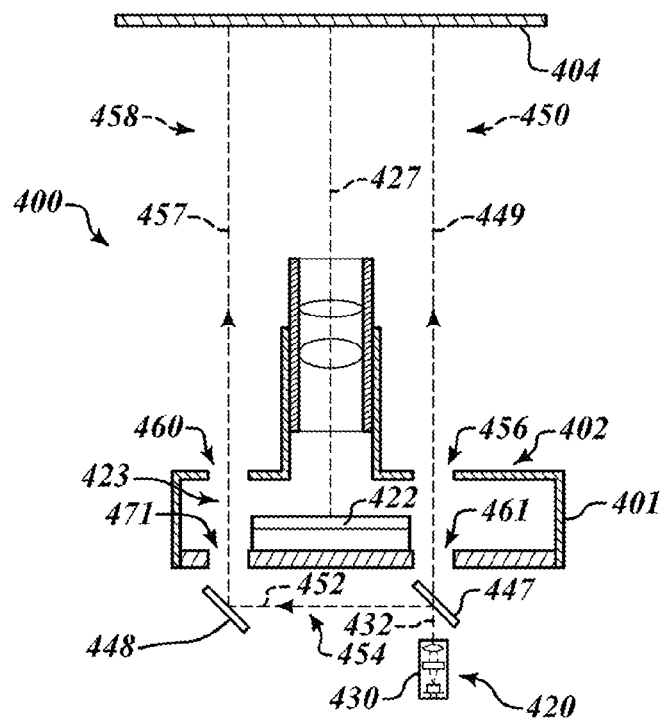
FIG. 5A is a schematic diagram of a machine-readable symbol reader with an aiming system, positioned relative to a machine-readable symbol, according to yet another embodiment.
Figure 5B:
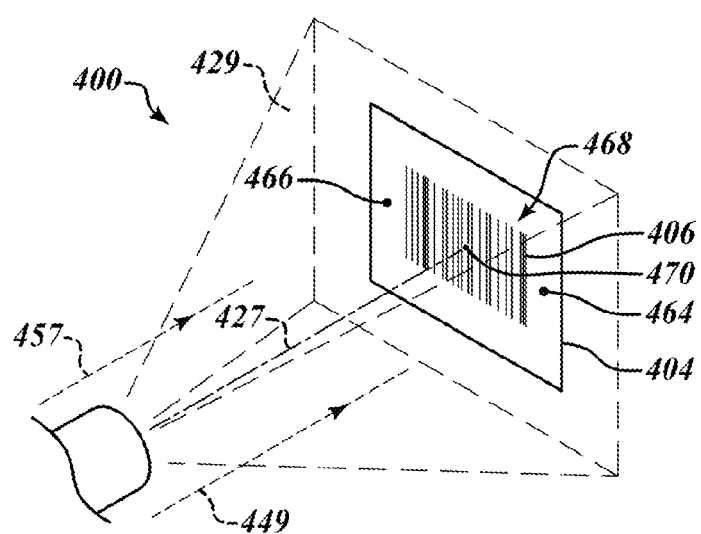
FIG. 5B is an isometric view of the machine-readable symbol reader of FIG. 5A, illustrating a field of view thereof and an aiming pattern projected by the aiming system.

FIGS. 5A and 5B show a machine-readable symbol reader 400 to read machine-readable symbols, according to another embodiment. The machine-readable symbol reader 400 includes an engine 402 to read an image of a machine-readable symbol 406 disposed on an item or object 404. In this embodiment, the engine 402 provides a variation in which an illumination source 420, a splitter 447, and a reflector 448 are located in a region aft of or behind an optical chamber 423, which houses an image sensor or sensor array 422. In particular, the illumination source 420, the splitter 447 and the reflector 448 are located aft of the image sensor or sensor array 422 to advantageously minimize, avoid, or mitigate interference of a light beam (e.g., aiming beam 432) with the functionality of the image sensor or sensor array 422. Again, the illumination source 420 may be mounted externally to a housing 401 and secured thereto.

The illumination source 420 is oriented in a manner such that the aiming beam 432 travels along a path that is substantially parallel to an optical axis 427 of the image sensor or sensor array 422. The aiming beam 432 generated by the illumination source 420 is split to a first beam 449 having a first optical path 450 and a transition beam 452 having a transition optical path 454. A portion of the aiming beam 432 is transmitted or passes through the splitter 447 to travel along the first optical path 450 toward a first entry aperture 461. The first entry aperture 461 facilitates the entry of the first beam 449 into the optical chamber 423 of the machine-readable symbol reader 400. The first beam 449 travels through the optical chamber 423 and exits from a first exit aperture 456.

The splitter 447 also reflects a portion of the aiming beam 432 to travel along the transition optical path 454 towards the reflector 448, such as a mirror, for example. As the transition beam 452 arrives at the reflector 448, the transition beam 452 is reflected to a second beam 457 having a second optical path 458 toward a second entry aperture 471. Again, the second entry aperture 471 facilitates the entry of the second beam 457 into the optical chamber 423 of the machine-readable symbol reader 400. The second beam 457 travels through the optical chamber 423 and exits from a second exit aperture 460.

Again, the first beam 449 is projected on the machine-readable symbol 406 at a first aiming spot 464 and the second beam 457 is projected on the machine-readable symbol 406 at a second aiming spot 466 to define an aiming pattern 468. As the first beam 449 and the second beam 457 travel in a direction that is substantially parallel to the optical axis 427 of the image sensor or sensor array 422, the aiming pattern 468 advantageously encompasses a central point 470 through the depth of field 429. Again, the central point 470 is an imaginary, geometric projection of the optical axis 427 on the machine-readable symbol 406.

While the embodiment of the machine-readable symbol reader 300 shown in FIGS. 5A and 5B includes an illumination source 420 that is oriented in a manner such that the aiming beam 432 travels along a path that is substantially parallel to the optical axis 427, in other embodiments, the illumination source 420 may be oriented to generate an aiming beam 432 that travels along a path that is substantially perpendicular to the optical axis 427 of the image sensor or sensor array 422. For example, in some embodiments, an interior housing member 430 that houses the illumination source 420 may be secured to a sidewall of the housing 401 to generate an aiming beam 432 that travels along a path that is substantially perpendicular to the optical axis 427.

Further, in some embodiments, the machine-readable symbol reader 400 may optionally and/or additionally include beam shapers to generate selectable aiming patterns on the item or object 404, as discussed in more detail above.

Moreover, although the various embodiments described herein illustrate at least a pair of aiming beams (e.g., first and second beams) having optical paths that are substantially parallel to the optical axis, in other embodiments, the machine-readable symbol reader may be operable to generate a multitude of aiming beams (e.g., third, fourth, fifth beams, etc.). Still further, in some embodiments, the aiming beams may have converging or diverging paths. For example, in some embodiments, the machine-readable symbol readers may include mirrors, collimators, splitters, or other optical components that provide converging or diverging paths. The optical paths of the aiming beams may converge or diverge to project aiming points or patterns that encompass a central point through the depth of field.

Moreover, the various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An engine for a machine-readable symbol reader, the engine comprising:
    an image sensor having a front via which light is received by the image sensor and a rear opposed across the image sensor from the front;
    at least one optical component positioned in an optical path of the image sensor, the image sensor and the at least one optical component having a receiving optical axis and a depth of field;
    a single illumination source; and
    two optical components positioned relative to the illumination source to direct light emitted by the illumination source outward of the engine as a first beam and at least a second beam, the two optical components positioned entirely behind the rear of the image sensor, the first and the second beams each parallel to the receiving optical axis of the image sensor and the at least one optical component at least along the depth of field of the image sensor and the at least one optical component, and the first and the second beams opposed to one another across the receiving optical axis of the image sensor and the at least one optical component to provide a visible aiming indication when impinging on an object.

2. The engine of claim 1 wherein the two optical components positioned relative to the illumination source to direct light emitted by the illumination source outward of the engine include a splitter and a reflector, the splitter positioned to receive light emitted by the illumination source and reflect a first portion of the received light as the first beam and pass a second portion of the received light to the reflector, the reflector positioned to receive the second portion of the received light and reflect the second portion of the received light as the second beam.

3. The engine of claim 2 wherein the illumination source is positioned to emit light in a direction that is perpendicular to the receiving optical axis.

4. The engine of claim 2 wherein the illumination source is positioned to emit light in a direction that is parallel to the receiving optical axis.

5. The engine of claim 2 wherein the illumination source is positioned to emit light in a direction that does not pass between the image sensor and the at least one optical component.

6. The engine of claim 2 wherein the splitter and the reflector are each oriented at a non-zero angle to a direction in which the illumination source emits the light.

7. The engine of claim 1, further comprising:
a first beam shaper positioned in a path of the first beam; and
a second beam shaper positioned in a path of the second beam, the first and the second beam shaper which form the first and at least the second beams as an aiming pattern.

8. The engine of claim 1, further comprising:
a housing having an optical chamber, the image sensor received in the optical chamber, and at least a portion of the light emitted by the illumination source passing through the optical chamber.

9. The engine of claim 8 wherein the housing having the optical chamber which houses the image sensor includes a front and a rear, the two optical components and the illumination source are positioned entirely behind the rear of the housing.

10. The engine of claim 1 wherein the illumination source is positioned to emit light in a direction that is perpendicular to the receiving optical axis, and the two optical components positioned relative to the illumination source include a first optical component and a second optical component, the first optical component positioned to receive light emitted by the illumination source pass a portion of the received light directly to the second optical component, such that the portion of the received light is perpendicular to the receiving optical axis.

11. The engine of claim 1 wherein the illumination source is positioned at a level that is relatively below the image sensor, and the illumination source emits light that is either perpendicular or parallel to the receiving optical axis.

12. The engine of claim 1 wherein the illumination source is positioned at a level that is relatively below the at least one optical component positioned in an optical path of the image sensor.

13. The engine of claim 1 wherein a first one of the two optical components is positioned relative to the illumination source to direct the first beam at a first angle which is perpendicular to a direction of light emitted by the illumination source, and a second one of the two optical components is positioned relative to the illumination source to direct the at least second beam at a second angle which is perpendicular to the direction of light emitted by the illumination source.

14. A machine-readable symbol reader to read machine-readable symbols, the machine-readable symbol reader comprising:
a housing having an optical chamber;
an image sensor having at least one portion exposed to an interior of the optical chamber, the image sensor having a front via which light is received by the image sensor and a rear opposed across the image sensor from the front;
a single aiming beam illumination source to emit light;
a first optical component that reflects a portion of the light emitted by the illumination source as a first beam and which passes a second portion of the light emitted by the illumination source; and
a second optical component that reflects at least some of the second portion of the light as a second beam, the first and at least the second beams which exit the housing and remain parallel with an optical image sensing axis of the machine-readable symbol reader over at least a depth of field of the image sensor, the first and the second optical components positioned entirely behind the rear of the image sensor.

15. The machine-readable symbol reader of claim 14 wherein the first beam is diametrically opposed from the second beam across the optical image sensing axis of the machine-readable symbol reader.

16. The machine-readable symbol reader of claim 15 wherein the first and second beams are equidistantly spaced apart from one another across the optical image sensing axis of the machine-readable symbol reader.

17. The machine-readable symbol reader of claim 14 wherein the first optical component is a splitter and the second optical component is a mirror, the splitter and the mirror each oriented at an angle to the optical image sensing axis of the machine-readable symbol reader.

18. The machine-readable symbol reader of claim 14, further comprising:
at least one beam shaper positioned to receive the first and the second beams, and control intensities of the first and second beams to form an aiming pattern.

19. The machine-readable symbol reader of claim 14, further comprising:
a lens assembly disposed in an optical path of the image sensor;
a collimator; and
a focusing lens, the focusing lens and the collimator positioned to direct the light emitted by the illumination source toward the first optical component.

20. The machine-readable symbol reader of claim 14 wherein the illumination source is located relatively behind the image sensor.

21. The machine-readable symbol reader of claim 14 wherein the illuminating source is oriented to emit the light in a direction perpendicular to the optical image sensing axis of the machine-readable symbol reader.

22. The machine-readable symbol reader of claim 14 wherein the housing comprises a first aperture through which the first beam is directed, a second aperture through which the second beam is directed, and a third aperture aligned with the optical image sensing axis of the machine-readable symbol reader, the first and the second apertures sized and shaped to prevent interference of the first and the second beams with the image sensor.

23. The machine-readable symbol reader of claim 14 wherein the first optical component comprises at least one of a diffractive beam splitter, a refractive beam splitter, or a dichroic mirror.

* * * * *